(12) United States Patent
Weiser

(10) Patent No.: US 7,828,396 B2
(45) Date of Patent: Nov. 9, 2010

(54) CRAWLER TRACK

(75) Inventor: Ralf Weiser, Ladenburg (DE)

(73) Assignee: Joseph Voegele AG, Mannheim (DE)

( * ) Notice: Subject to any disclaimer, the term of this patent is extended or adjusted under 35 U.S.C. 154(b) by 149 days.

(21) Appl. No.: 12/197,943

(22) Filed: Aug. 25, 2008

(65) Prior Publication Data

US 2009/0102282 A1    Apr. 23, 2009

(30) Foreign Application Priority Data

Oct. 18, 2007   (EP)   ................... 07020443

(51) Int. Cl.
*B62D 55/30* (2006.01)
*B62D 55/08* (2006.01)
(52) U.S. Cl. ...................... 305/145; 305/125
(58) Field of Classification Search ............ 305/124, 305/125, 127, 128, 129, 130, 132, 134, 143, 305/144, 145, 146, 147, 148, 155; 180/9.5, 180/9.52, 9.62, 9.64

See application file for complete search history.

(56) References Cited

U.S. PATENT DOCUMENTS

| 3,899,218 | A | * | 8/1975 | Blomstrom et al. ............ 305/9 |
| 4,324,303 | A | * | 4/1982 | Balzer et al. ................. 180/9.5 |
| 4,410,219 | A |   | 10/1983 | van der Lely |
| 4,650,260 | A | * | 3/1987 | Satzler ....................... 305/155 |
| 5,927,412 | A |   | 7/1999 | Crabb |
| 6,267,459 | B1 |   | 7/2001 | Becker et al. |
| 7,520,575 | B2 | * | 4/2009 | Johnson ..................... 305/144 |

FOREIGN PATENT DOCUMENTS

| DE | 4193446 | 4/2001 |
| EP | 0721879 | 7/1996 |
| WO | 8101395 | 5/1981 |
| WO | 9511816 | 5/1995 |

* cited by examiner

*Primary Examiner*—S. Joseph Morano
*Assistant Examiner*—Kip T Kotter
(74) *Attorney, Agent, or Firm*—Fish & Richardson P.C.

(57) ABSTRACT

In a crawler track comprising at least one guide wheel and caster wheels at a track carrier, at least one driving wheel for the track, and a guide wheel tensioning device including at least one tensioning member which acts on the guide wheel via a tensioning lever supported at the track carrier, the guide wheel is provided in a guide part which is exclusively linearly moveable and is laterally supported in the track carrier with a slide block arranged between the guide part and the tensioning lever, which slide block can slide crosswise and relatively to the linear direction of movement of the guide part while transmitting the tensioning force substantially parallel to the linear direction of movement of the guide part.

11 Claims, 2 Drawing Sheets

CRAWLER TRACK

The invention relates to a crawler track comprising at least one guide wheel and caster wheels at a track carrier, at least one driving wheel for the track, and a guide wheel tensioning device, including at least one tensioning member which acts on the guide wheel via a tensioning lever supported at the track carrier.

BACKGROUND OF INVENTION

In crawler tracks known from WO 81/01395 A, U.S. Pat. No. 5,927,412 A, U.S. Pat. No. 6,267,459 B1, DE 4193446 A, EP 0 721 879 A, U.S. Pat. No. 4,410,219 A, the guide wheel is pivoted about the pivot bearing of the tensioning lever at the crawler carrier when tensioning the track or CATERPILLAR chain. The tensioning lever has to transmit the tensioning force and at the same time to laterally support the guide wheel. As the pivot axis of the tensioning lever at the track carrier has a distance from the axis of the guide wheel, a stable lateral support of the guide wheel can hardly be achieved. Due to the arc-shaped path of the axis of the guide wheel during movements against the spring action of the tension cylinder or during a tensioning cycle, the interior geometry of the crawler track is frequently varied. The guide wheel imparts lateral forces on the tensioning lever and on the suspension of the tensioning lever. The tensioning cylinder also might cause lateral force components. This causes an unstable traveling property and the danger of losing the track or the CATERPILLAR chain and generates strong wear to the respective suspensions.

In the crawler track disclosed in WO-A-95/11816 the axis of the guide wheel is supported in a slide part. The slide part is linearly guided in a shaft fixed to a transmission casing of the crawler track. A tensioning cylinder arranged between the slide part and the transmission casing actuates the slide part in tensioning direction.

SUMMARY OF THE INVENTION

It is an objective of the invention to provide a crawler track of this kind which is characterized by a compact tensioning device allowing to stably support the guide wheel in lateral directions, and to transmit tensioning forces to the guide wheel without any lateral force components.

This objective is achieved through use of a crawler track comprising at least one guide wheel and caster wheels at a track carrier, at least one driving wheel for the track, and a guide wheel tensioning device, including at least one tensioning member which acts on the guide wheel via a tensioning lever supported at the track carrier.

As the at least one guide wheel is supported in the guide part, which in turn is guided exclusively linearly in the track carrier, the tensioning lever does not need to stabilize the guide wheel. A stable lateral support of the guide wheel is assured whenever the guide wheel yields counter to or moves due to the tensioning force of the tensioning member. The tensioning member transmits the tensioning force via the tensioning lever to the guide part and in turn to the guide wheel. However, this force transmission takes place without undesirable lateral forces since the slide block only allows for the transmission of forces to the guide wheel, which forces are oriented in the linear direction of the movement of the guide part, and because the slide block compensates for the differences in the movements of the pivoting tensioning lever and the linearly moving guide part. A favourably long lever force arm can be used for the tensioning lever, because the tensioning force is transmitted from the tensioning lever via the slide block to the guide part. A structural separation is provided between the lateral support of the guide wheel and the transmission of the tensioning force. The tensioning device has a compact size, allowing to provide a small distance only between the guide wheel and the next caster wheel. Furthermore, a small diameter guide wheel (or a guide wheel pair) may be implemented, because the laterally stably supported guide part even transmits large lateral forces directly to the track carrier. The surface pressure at the slide block is moderate, such that even for long service times, only low wear has to be expected.

In order to transmit the tensioning force to the laterally supported guide wheel or guide wheel pair, two different principles are expedient. The slide block is pivotally linked either to the tensioning lever and moves lateral to the linear direction of the movement of the guide part during pivot movements of the tensioning lever, or the slide block is pivotally linked to the guide part and moves laterally to the linear direction of the movement of the guide part during pivot movements of the tensioning lever within or on the tensioning lever. In each case, only tensioning forces or supporting forces will be transmitted on the guide part and, in turn, on or from the guide wheel substantially parallel to the linear direction of the guide part movements.

The slide block is arranged on a pivot axis defining in the slide block a first force transmission area of a determined size. At the location where the slide block is in contact either with the guide part or with the tensioning lever, in order to transmit the tensioning force and the support force, a second force transmission area is defined, which is larger in size than the first force transmission area, in order to minimize wear between flat surfaces sliding on each other and to reduce the surface pressure.

In order to achieve symmetrical force transmission conditions and to allow to impart or take up large forces, expediently, a respective tensioning member and a tensioning lever are provided at both sides of the guide part. The tensioning member may be a tensioning cylinder, a tensioning unit or a pressure spring. Both tensioning levers are coupled via the common pivot axis on which the slide block is supported pivotably and centrally between the tensioning levers.

In a particularly preferable embodiment, the track carrier is a solid thick steel sheet plate which is arranged upright and replaces the conventional U-shaped profile or box profile of known track carriers, such that mounting space is saved in a lateral direction. The steel sheet plate comprises a linear guiding jaw for the guide part and at least one free space for accommodating the slide block and the pivot axis. Both tensioning members and both tensioning levers are mounted at both sides of the steel sheet plate at which also caster wheels or caster wheel rocker bearings are mounted.

In an expedient embodiment, the linear guiding jaw for the guide part is open at one laterally located side. At this open side, the inserted guide part, at least in regions, is covered and supported laterally by a guiding plate removably fixed at the steel sheet plate. On the opposite side, the guide part may be directly supported laterally at integral guiding parts of the steel sheet plate. Alternatively, the linear guiding jaw may be open at both lateral sides and may be covered there by guiding plates which then laterally support the guide part in the guiding jaw. Each guiding plate is, expediently, removably fixed, for maintenance purposes, lubricating purposes, and for assembling purposes. However, and more expedient, the two guiding plates are mounted removably to both sides of the guiding jaw, in order to facilitate assembly and maintenance, and to allow to make the guiding plates from, in some cases, a better or other material than the material of the steel sheet plate, since the guiding plates have to cope with higher requirements of wear resistance and strength.

In an expedient embodiment, the slide block is engaging into the guide part, such that the contact area between the slide block and the guide part is shielded to the exterior against contamination (lubricant stored inside). The slide block may have sidewardly protruding pins, which engage into lateral slots in the guide part, which slots are open from the inside to the outside. The engaging guiding pins prevent irregular relative movements of the slide block in contact with the guide part. Furthermore, the engagement of the pins allows to pull back the guide part via the slide block.

In order to prevent the intrusion of contamination through the respective slot, it may be expedient to cover the slot from the outer side by the guiding plate of the guiding part. Alternatively, the slide block may abut bluntly at the end of the guide part, or even may be U-shaped, to grip around the end of the guide part.

In a further alternative, the pivot axis extending between both tensioning levers directly penetrates a through-hole in the guide part, such that the pivot axis is then supported via the slide block in this through-hole in the guide part. This could be an even more compact solution.

When the pins engaging into the slot or the slots are offset in relation to each other, they will prevent the slide block inadvertently pivoting about the pivot axis when the tensioning device is in unloaded condition.

Due to the compactness of the tensioning device, a first caster wheel next to the guide wheel may be provided below the tensioning member and close to, or even in overlap with the respective tensioning lever. Preferably, the caster wheels are suspended in tandem arrangements at rocker bearings at the track carrier. A first rocker bearing may even be mounted directly below the tensioning member.

In order to achieve a favourable force lever arm for transmitting the tensioning force or the supporting force, it may be expedient to provide the pivot axis of the slide block at the tensioning lever approximately midway between a tensioning member bearing and a track carrier pivot bearing of the tensioning lever. Preferably, the pivot axis is placed somewhat sideward of a theoretical line connecting both bearings.

The tensioning member bearing may comprise two bearing blocks at the tensioning lever in order to transmit large forces to the tensioning lever without wear and without lateral components. Both bearing blocks may be penetrated by a common linking pin. A lug of a piston rod e.g. may be linked to the linking pin. Expediently, a universal joint is provided between the lug of the piston rod and the linking pin, in order to prevent generating lateral force components between a piston rod of the tensioning member and the tensioning lever.

It may be expedient to match the positions of the pivot axis at the tensioning lever, of the track carrier pivot bearing and of the tensioning member at the track carrier with the positions of the guide part and the load bearing surface of the guide part, such that the direction of the tensioning force transmitted by the pivot axis is, at least substantially, parallel to the linear direction of the movement of the guide part. This concept avoids undesirable force components from the pivot movement of the tensioning lever, which force components would be inclined with respect to the guide part moving direction in the linear guiding jaw. Hence, the guide part can be moved smoothly and such that it underlies hardly any wear.

BRIEF DESCRIPTION OF THE DRAWINGS

Embodiments of the invention will be explained with the help of the drawings. Shown in the drawings is.

DETAILED DESCRIPTION OF THE INVENTION

Figure 1:
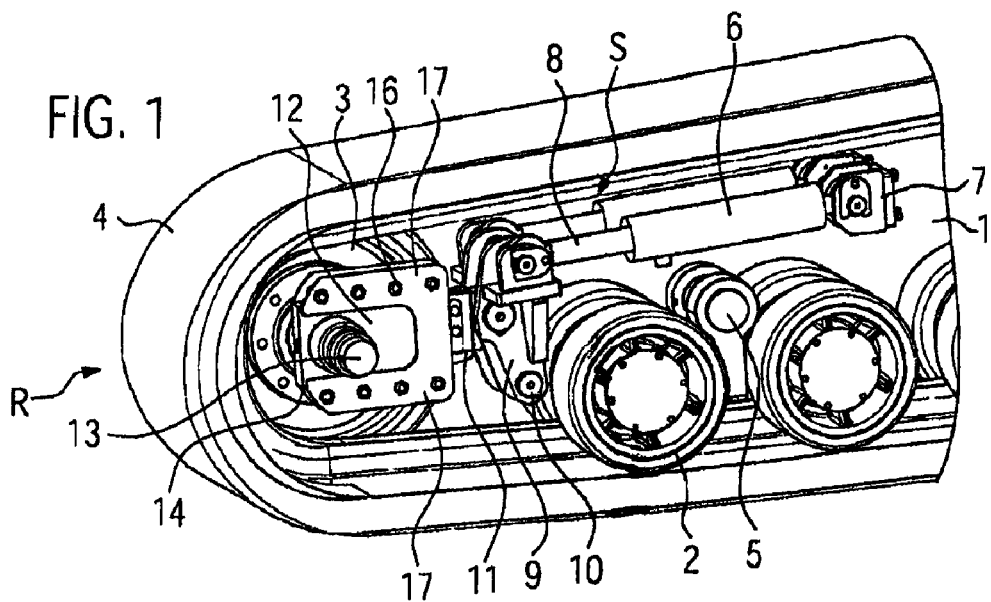
FIG. 1 a perspective view, from the exterior and obliquely downward of a part of a crawler track, FIG. 2 a perspective view in a viewing direction from the plane of the drawing of FIG. 1, onto the crawler track, where some components are removed, FIG. 3 a perspective view similar to the view of FIG. 3, with some components removed, and FIG. 4 a perspective view of a detail.
Figure 2:
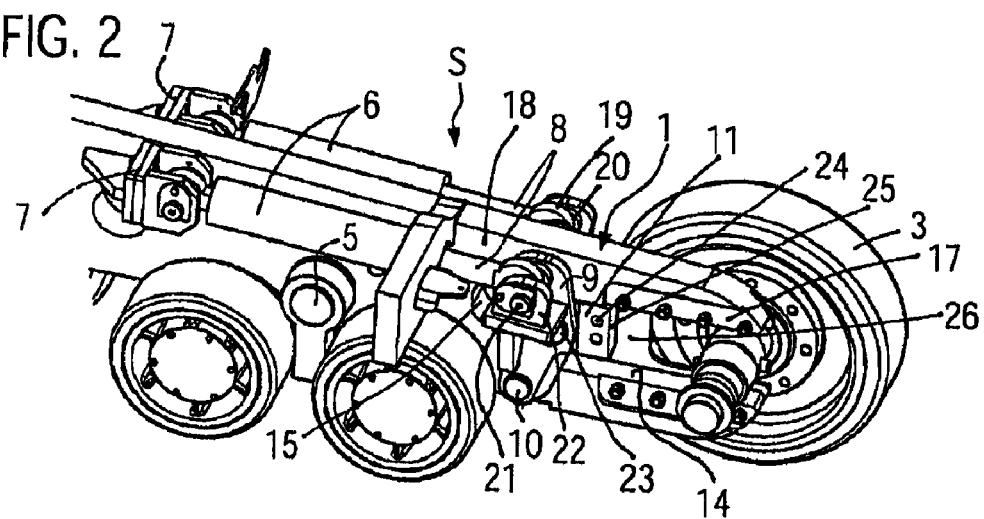

A crawler track R, in FIG. 1, e.g. a rubber crawler track for a road finisher or a road finisher feeder vehicle, has, at the front side of a track carrier 1, one broad or two narrower guide wheels 3, with a respective solid rubber jacket, and respective, pair-wise caster wheels 2, on rocker bearings 5. (One guide wheel 3 of a pair, has been removed, for a better understanding). The caster wheels 2, on both sides of the track carrier 1, and the guide wheels 3, are surrounded by a rubber track 4 which also extends over a not shown driving wheel. At least one side of the track carrier 1 a tensioning member 6, e.g. a hydraulic tensioning cylinder, is mounted in a tensioning cylinder bearing 7. The tensioning member 6 instead may be a mechanical tensioning unit or a pressure spring. According to FIGS. 2 and 3, tensioning cylinders of equal dimensions, are mounted on both sides of the track carrier 1. The tensioning cylinder has a piston rod 8, which is linked to a tensioning lever 9, which is pivotally supported in a pivot bearing 10 at the track carrier 1. The tensioning lever 9 co-acts with a slide block 11, explained in greater detail referring to FIGS. 2, 3 and 4. The slide block 11 urges a guide part 12 of a tensioning device S. An axis 13 of the guide wheels 3 is provided in the guide part 12, which, e. g., is formed like a block. The movement of the guide part 12 is exclusively linearly guided in a linear guiding jaw 14 of the track carrier 1. A free space 15 is provided in the track carrier 1. At the lower and upper outer edges of the linear guiding jaw 14, recessed sockets 17, comprising threaded bores 16, are formed for the mounting of guiding plates 26 (FIG. 2). In FIG. 1, the guiding plate 26, normally mounted at the front side in viewing direction, has been removed.

The guide cylinder/the guiding cylinders serves/serve as the tensioning member 6 for tensioning the track 4 and yieldably supporting the guide wheel 3. The slide block 11 converts the pivot movements of the tensioning lever 9, about the pivot-bearing 10, into linear movements of the guiding part 12.

According to FIG. 2, which shows both tensioning cylinders and both tensioning levers 9 at the sides of the track carrier 1, the guide part 12 is removed from the linear guiding jaw 14. The guiding plate 26, mounted at the rear side in viewing direction, is arranged such that it grips over one side of the guide part 12 (when inserted) from the linear boundaries of the linear guiding jaw 14. The guiding plate 26, furthermore, covers a significant part of the guide part 12 at the end which faces towards the guide wheel 3. In this manner, the linearly guided guide part 12 is supported laterally by both guiding plates 26.

The track carrier 1 is a thick and solid steel sheet plate 18, which is arranged upright and at which the components of the crawler track R and of the tensioning device S are mounted.

A lug 19 of the piston rod 8 is pivotally linked to a lateral linking pin 21 provided in a tensioning cylinder bearing of the tensioning lever 9. This bearing has two distant bearing blocks 22. Expediently, the lug 19 of the piston rod is supported on the lateral linking pin 21 via a universal joint 20. Approximately in the middle, between the bearings 22 and 10, in this embodiment, a pivot axis 23 for the slide block 11 is arranged at the tensioning lever 9. The position of the pivot axis 23 is somewhat offset in the direction towards the guide wheel 3 and in relation to a theoretical line interconnecting the bearings 22, 10. The pivot axis 23 couples both tensioning levers 9 and supports the slide block 11. The slide block 11 has a flat front surface 25 for co-action with a counter surface F of the guide part 12. Furthermore, bores 24 may be provided in the slide block 11 for inserting guiding pins 30 (FIG. 3).

The tensioning force of the tensioning cylinders is transmitted via the tensioning levers 9 and the pivot axis 23 by a pivot movement to the slide block 11. The slide block 11 does not pivot relative to the guide part 12, but converts the pivot movement into a linear movement of the guide part 12 while the slide block 11 slides laterally at the guide part 12 in relation to the linear direction of the movement of the guide part 12 in the linear guiding jaw 14.

Figure 3:
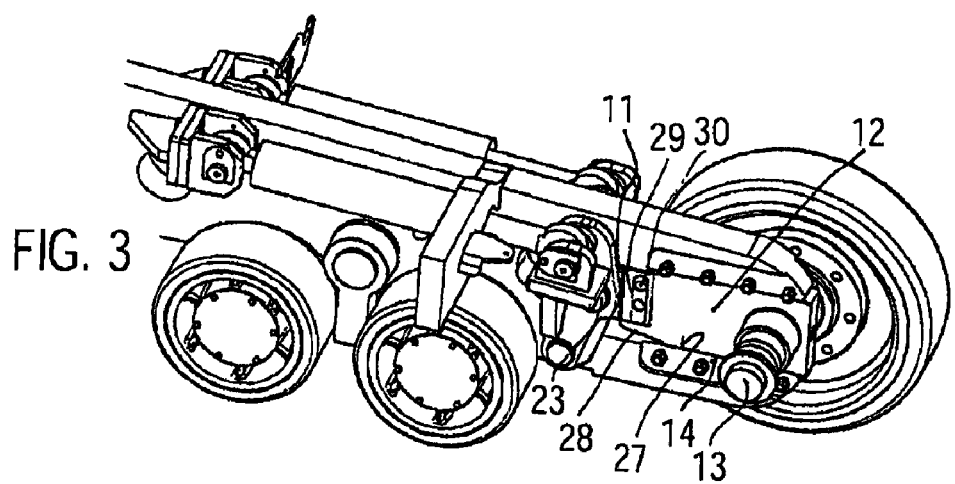
Figure 4:
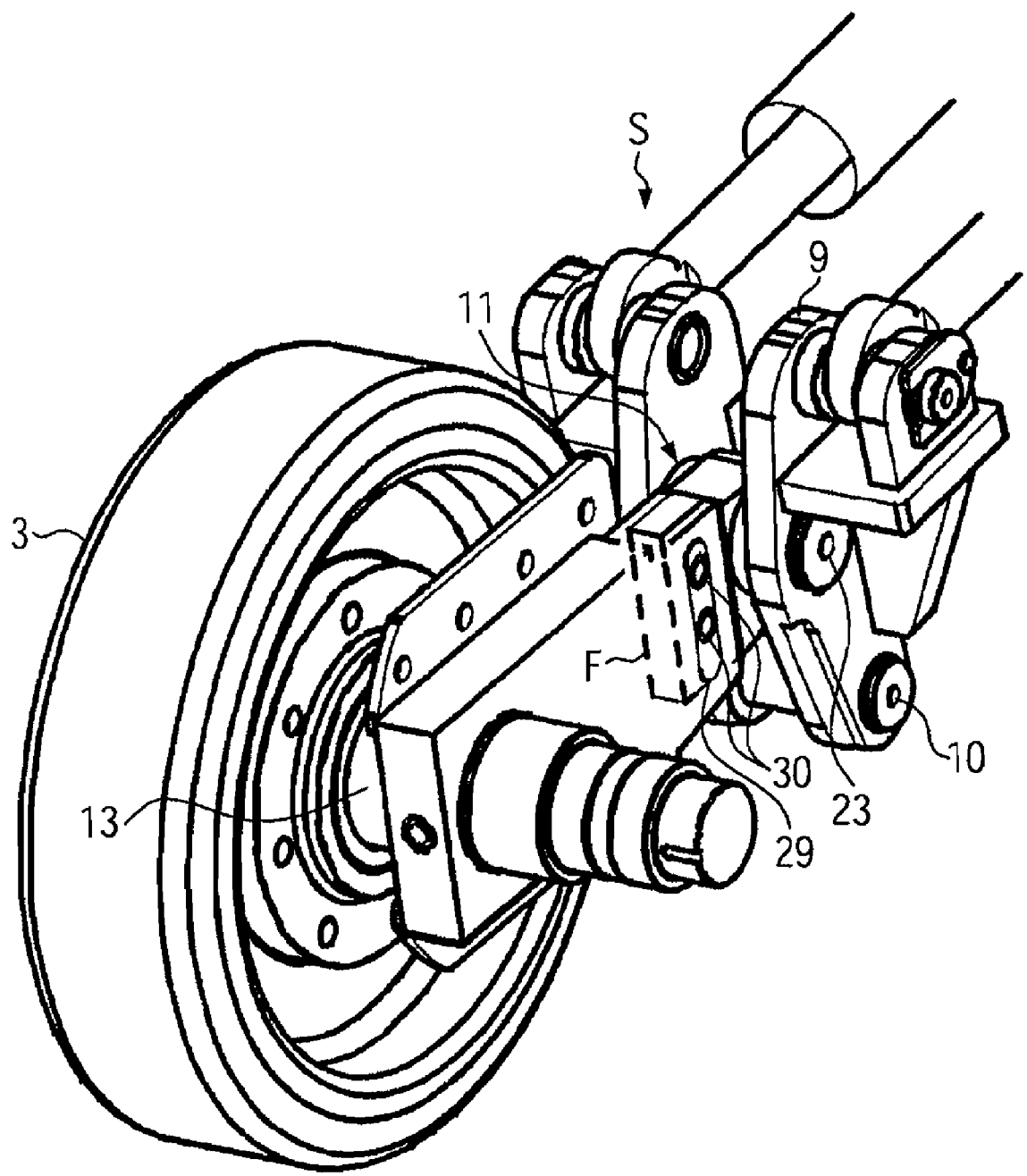

In FIG. 3 the guide part 12 is inserted into the linear guiding jaw 14. The slide block 11 engages somewhat into the interior of the guide part 12, which, e. g., may be U-shaped and hollow at the end facing the slide block 11 (FIG. 4). In the guide part 12, e. g., at both sides, guiding slots 29 are provided, into which the guide pins 30 of the slide block 11 engage. The guide part 12, e. g. is fitted only in its frontal portion and in the region of the axis 13, precisely with parallel and straight surfaces 27 into the linear guiding jaw 14, while the rear end of the guide part 12 may be somewhat tapered like a wedge (at 28). When the guiding plate 26 is mounted, which is needed in FIG. 3, as well on the viewing side, the guiding plate 26 may cover the guiding slot 29 from the outer side.

The mounted guide part 12 is linearly guided in the linear guiding jaw 14 at the upper and lower sides, and is supported at the same time at both sides without any significant clearances by the guiding plates 26.

In the embodiment of FIG. 4 the flat front surface 25 (shaped like an upright standing rectangle) provided at a nose of the slide block 11 bluntly abuts at a flat counter surface F in a slot at the end of the guide part 12. The nose of the slide block 11 engages the slot. The nose defines the front surface 25 and has two guiding pins 30 which are placed above each other in at least one side of the nose. The guiding pins 30 couple the guide part 12 and the guide block 11 in order to allow the pulling back of the guide part 12 via the tensioning lever 9 and to prevent the slide block 11 from rotating about the pivot axis 23 when the tensioning device is unloaded. The dimensions of the front surface 25 of the slide block 11 and of the counter surface F of the guide part 12 are matched with the position of the pivot axis 23 such that in loaded and active condition of the tensioning device and with friction contact between the slide block 11 and the guide part 12 the slide block 11 is hindered from pivoting about the pivot axis 23.

In an alternative embodiment, the slide block 11 could be moveably supported within the tensioning lever 9, laterally to the linear direction of movements of the guide part 12. In this case, the pivot axis 23 would be supported in the guide part 12.

The pivot axis 23 (by its diameter) defines in the slide block a force transmission area of a pre-determined size. The front surface 25 of the slide block 11, e. g. is larger than the first force transmission area, in order to minimize surface pressure between the slide block 11 and the guide part 12.

In a further alternative embodiment, the pivot axis 23 may directly engage at the guide part 12 or may penetrate a through hole of the guide part 12, respectively, and may slidably engage in this through hole laterally to the linear direction of the movements of the guide part 12, in some cases even via an inserted slide block 11.

In a further alternative embodiment, a single tensioning member 6 could be provided, which is mounted centrally at the upper side of the track carrier 1, or which is sunk into the upper side of the track carrier. The tensioning member 6 e.g. may be a tensioning cylinder, the piston rod 8 of which may actuate both tensioning levers 9 via a common lateral linking pin (replacing the two lateral linking pins 21 in FIG. 2).

The invention claimed is:

1. Crawler track assembly, for a road finisher or road finisher-feeder vehicle equipped with a rubber crawler track, the crawler track assembly comprising:
   at least one guide wheel and caster wheels at a track carrier, at least one driving wheel for the rubber crawler track and a guide wheel tensioning device including at least one tensioning member which acts on the guide wheel via a tensioning lever which is pivotably supported at the track carrier, wherein the guide wheel is arranged at a guide part which is laterally supported and exclusively linearly moveable in the track carrier, and that a slide block is provided between the guide part and the tensioning lever, which slide block is arranged for a relative sliding movement crosswise to the direction of the linear movements of the guide part.

2. Crawler track assembly according to claim 1, wherein the slide block is pivotally linked to the tensioning lever at a pivot axis and slides at the guide part.

3. Crawler track assembly according to claim 1, wherein on both sides of the guide part as tensioning members, a respective hydraulic tensioning cylinder and a respective tensioning lever are provided, and that both tensioning levers are coupled by a common pivot axis on which the slide block is pivotally supported.

4. Crawler track assembly as in claim 1, wherein the track carrier is a solid steel sheet plate which is arranged upright and which has a cut-out linear guiding jaw for the guide part.

5. Crawler track assembly according to claim 4, wherein the steel sheet plate has a free space at least for accommodating the slide block and a pivot axis, and that the tensioning lever, the at least one tensioning member and the caster wheels or rocker bearings for the caster bearings, respectively, are mounted at the steel sheet plate.

6. Crawler track assembly according to claim 4, wherein in or on at least one side of the steel sheet plate, a guiding plate is removably mounted which at least partially covers the guide part in the linear guiding jaw and which supports the guide part laterally, or that guiding plates are mounted at both sides of the steel sheet plate.

7. Crawler track according to claim 1, wherein the guide part having a slot for the engagement of the slide block, that openings are defined by slots situated in the side cheeks and extending substantially crosswise to the direction of the linear movements of the guide part, and that guiding pins are provided on the slide block, two guiding pins lying upon each other in one side or in both sides of the slide block.

8. Crawler track according to claim 1, wherein one of the caster wheels, which is a first caster wheel next to the guide wheel, is arranged at the track carrier below the tensioning member adjacent to the tensioning lever, at a rocker bearing mounted below the tensioning member.

9. Crawler track according to claim 1, wherein a pivot axis for the slide block is arranged at the tensioning lever approximately in the middle between a tensioning member bearing and a track carrier pivot bearing of the tensioning lever, offset in relation to a connecting line between both bearings.

10. Crawler track according to claim 9, wherein the tensioning member bearing is defined by two bearing blocks at the tensioning lever, a lateral linking pin penetrating both bearing blocks, and a universal joint on the linking pin for a lug of a piston rod of the tensioning member.

11. Crawler track according to claim 1, wherein the positions of a pivot axis at the tensioning lever, of a track carrier pivot bearing and the tensioning member at the track carrier are matched such with the positions of the guide part and a flat counter surface of the guide part abutting at a front surface of the slide block that the direction of tensioning forces transmitted from the pivot axis via the slide block to the guide part is at least substantially parallel to the linear direction of movements of the guide part.

* * * * *